C. E. BIRCH.
EDUCATIONAL CHART.
APPLICATION FILED JAN. 16, 1915.
1,139,329.
Patented May 11, 1915.
2 SHEETS—SHEET 1.
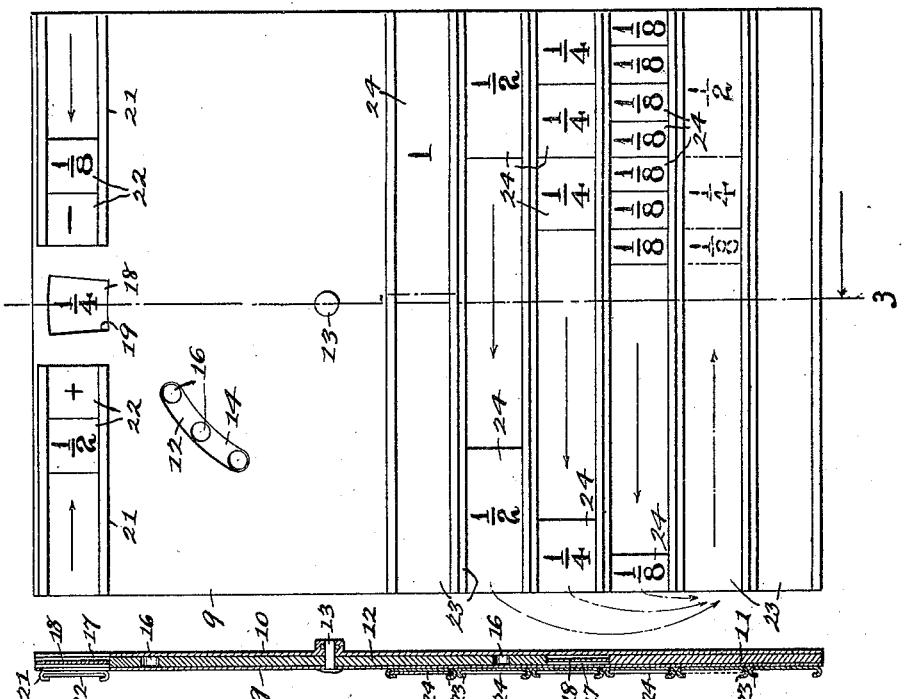
WITNESSES:
Jw. wells
J. C. Larsen
INVENTOR
Clarence E. Birch
BY
ATTORNEYS C. E. BIRCH.
EDUCATIONAL CHART.
APPLICATION FILED JAN. 16, 1915.
1,139,329.
Patented May 11, 1915.
2 SHEETS—SHEET 2.
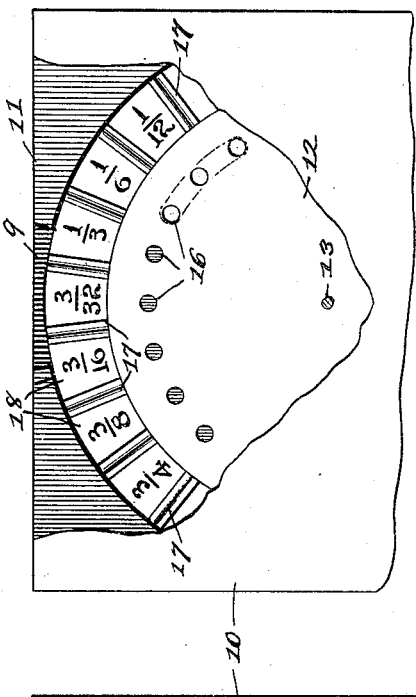
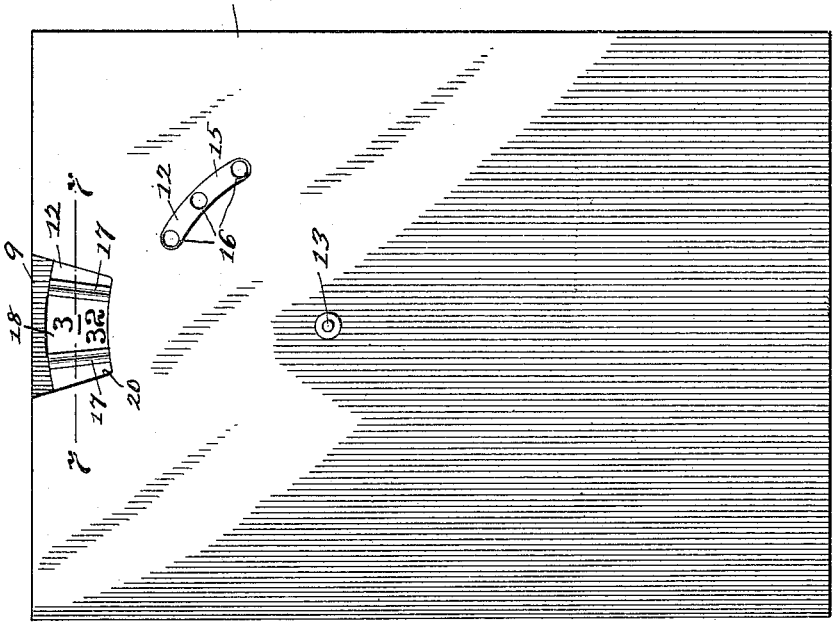
WITNESSES:
INVENTOR
Clarence E. Birch
BY
ATTORNEYS

UNITED STATES PATENT OFFICE.

CLARENCE ELLIS BIRCH, OF LAWRENCE, KANSAS.

EDUCATIONAL CHART.

1,139,329.  Specification of Letters Patent.  Patented May 11, 1915.

Application filed January 16, 1915. Serial No. 2,616.

*To all whom it may concern:*

Be it known that I, CLARENCE E. BIRCH, a citizen of the United States, and a resident of Lawrence, in the county of Douglas and State of Kansas, have invented certain new and useful Improvements in Educational Charts, of which the following is a specification.

My invention relates to charts adapted for use in the teaching of arithmetic to children, and one of the main objects thereof is to provide a device of such form as to facilitate certain fundamental drills and to make them interesting and effective and, also, by making them competitive.

A further object is to provide such a device by means of which the pupils are developed in accordance with a scientific method.

A further object is to provide such a device wherein the problem always appears at a certain point and mental calculation is developed by sight reading of the successive problems.

A further object is to provide such a device wherein the successive problems may be made to rapidly appear at a certain point and thus provide a sort of game for the pupils in their efforts to quickly solve the same.

A further object is to provide such a device wherein portions of problems may be changed at each of a plurality of places contiguous to each other, so as to vary the number of possible combinations, either of addition, subtraction, multiplication, division, etc.

A further object is to provide such a device wherein certain movable and substitutive elements ocularly demonstrate the values of numbers, units and fractions thereof; and further objects are to provide such charts which are simple in construction and use, capable of a wide range of ocular instruction, and comparatively inexpensive.

My invention is fully described in the following specification, of which the accompanying drawings form a part, in which like reference characters are used to designate like parts in each of the views, and in which:—

Figure 1 is a front elevation of my invention, with one arrangement of movable elements thereon; Fig. 2 is a similar view, partly broken away to show the construction, with one of the movable or substitutive elements replaced by another; Fig. 3 is a section taken on the line 3—3 of Fig. 1; Fig. 4 is a rear elevation; Fig. 5 is a fragmentary rear elevation, partly broken away; Fig. 6 is an enlarged fragment of the rotatable disk; Fig. 7 is an enlarged section taken on the line 7—7 of Fig. 4; and Fig. 8 is a detached view of one of the removable disk blocks.

In the drawings forming a part of this application I have shown a present preferred form of embodiment of my invention, comprising a front plate 9, a rear plate 10, an intermediate plate 11 having a circular opening therein for a disk 12 pivoted at 13 to the front and rear plates, all of these parts being made of suitable light and rigid material and said front and rear plates are provided with registering segmental slots 14 and 15, respectively, concentric with the pivot 13, to enable the operator or teacher to revolve the disk 12, finger holes 16 being provided in said disk at regular intervals for this purpose.

The disk 12 is provided with a plurality of peripheral pockets formed by radially arranged, channeled, strips 17, Figs. 6 and 7, adapted to receive removable blocks 18 of corresponding shape and which are held in the respective pockets either frictionally or because of the intermediate plate 11 in which the disk moves, the front plate having a window 19 whereat any one of said blocks is visible, and the rear plate having a corresponding opening 20 to enable the teacher to determine which particular block is visible to the pupils. In order to positively register a block at the window 19 the concentric slots 14 and 15 are made of a length, preferably, which reveals three of the finger holes 16 and the ends of said slots registering with the corresponding edges of the outer finger holes.

The front plate is provided, on each side of and in the horizantal plane of the window 19, with clips 21 formed with forwardly hooked flanges to guide and retain rectangular blocks 22, each of which blocks may bear a letter, numeral, or other character or legend, as may also each of the blocks 18 carried by the disk 12, and, to provide the greatest possible number of combinations with a given number of blocks of each kind, I will provide suitable designating matter of a mathematical character on the backs thereof. The lower portion of the front plate 9 is also provided with parallel and horizontally arranged clips 23, of any desired number, and each of which is adapted to receive one or more blocks 24 also suitably inscribed, the arrangement in the form illustrated being for the purpose of graphically explaining fractional parts of a unit, as in Fig. 2, or for fractional parts of fractions of a unit, as in Fig. 1, these demonstrations being shown at the right hand side of the device, and I may also, as shown in Fig. 1, demonstrate the subtraction of a fractional part from a unit, or the fractional part of a fraction.

In the early stages of mental development I will provide successively halved series of blocks, but as the pupil advances I may vary the use and arrangement of units, fractions, or decimals at will, as will be obvious, at any or all of the block positions. I may also provide the minus sign on one block adjacent the window 19 and the plus sign on another, as shown in Fig. 1, whereby the pupils are requested to solve a problem such as "How much is one-half plus one-fourth?" and another "How much is one-fourth minus one-eighth?" with each block brought into view at said window as a substitute for the "one-fourth" block shown, when the teacher or operator revolves the disk 12, either by successive steps or at random, the intent being to develop mental calculation of frequently changed, visualized, problems, as in arithmetic.

With modifications over the arrangements shown, my chart is adapted for instruction in addition; subtraction; multiplication; division; cancellation; finding least common multiple or greatest common divisor; percentage; interest; profit and loss; reduction of fractions; subtraction of fractions; multiplication of fractions; division of fractions; decimal fractions; squares of numbers; square and cube root, etc., and I do not, therefore, confine myself to the particular symbols shown on the various blocks, neither do I desire to limit myself to the exact relative positions of the various series of blocks. I may also provide means other than a revoluble disk for carrying any one of a plurality of symbols into visible conjunction with the relatively or temporarily fixed symbols to form a problem.

My invention consist, broadly, in the provision of temporarily fixed blocks or elements bearing, each, a desired symbol forming, in combination with each of a plurality of instantly replaceable blocks or elements bearing, each, a desired symbol, a problem, as in elemental arithmetic. I provide, in addition to the above, a plurality of contiguous series of substitutive blocks or elements, by means of which the answer to a problem shown on the chart may be ocularly proven in a readily understandable manner, and also by means of which certain arithmetical combinations or divisions may be understandably demonstrated, such as the divisions of a yard, foot, inch, etc. I may, therefore, make many structural changes over the chart shown, within the scope of the following claims, and still be within the spirit of my invention, and without a sacrifice of any of its advantages.

Having fully described my invention, what I claim as new, and desire to secure by Letters Patent, is:—

1. An educational chart, comprising a relatively fixed member provided with means adapted to receive any one of a plurality of interchangeable elements bearing, each, a desired symbol, a movable member in operative connection therewith provided with means adapted to receive any one of a plurality of interchangeable elements bearing, each, a desired symbol, and means for revealing any one of the symbols on said movable member adjacent the symbols on said fixed member, to form an arithmetical problem.

2. An educational chart, comprising a relatively fixed member provided with means adapted to receive any one of a plurality of interchangeable elements bearing, each, a desired symbol, a movable member in operative connection therewith provided with means adapted to receive any one of a plurality of interchangeable elements bearing, each, a desired symbol, said fixed member being provided with a window wherein any one of the symbols on said movable member may be revealed to form, with the symbols on said fixed member, an arithmetical problem, and means for moving said movable member.

3. An educational chart, comprising a relatively fixed member provided with an opening therethrough, means thereon adapted to receive any one of a plurality of interchangeable elements adjacent said window bearing, each, a desired symbol, a revoluble disk on said member provided with a plurality of peripheral pockets, an interchangeable block in each pocket bearing a desired symbol, and means for revolving said disk, said window being in the peripheral line of said blocks whereby any block may be rendered visible through said window to form, with said interchangeable elements, an arithmetical problem.

4. An educational chart, comprising a relatively fixed member provided with an opening therethrough, a clip adjacent said window and on each side thereof adapted to receive any one of a plurality of interchangeable elements bearing, each, a desired symbol, a movable member in operative connection with said fixed member bearing a plurality of desired symbols adapted, each, to be brought to said window to form, with said interchangeable elements, an arithmetical problem, and a plurality of supplemental clips on said fixed member adapted, each, to receive any one of a plurality of interchangeable elements bearing, each, a desired symbol whereby solutions of problems may be ocularly demonstrated.

In testimony whereof I have signed my name to this specification in the presence of two subscribing witnesses.

CLARENCE ELLIS BIRCH.

Witnesses:
J. D. GUVITT,
ANNA H. MARTINDALE.

Copies of this patent may be obtained for five cents each, by addressing the "Commissioner of Patents, Washington, D. C."